US008900167B2

(12) United States Patent  
Agrawal et al.

(10) Patent No.: US 8,900,167 B2
(45) Date of Patent: Dec. 2, 2014

(54) PASSIVE SWING ASSIST LEG EXOSKELETON (75) Inventors: Sunil Agrawal, Newark, DE (US); Kalyan K. Mankala, Wallingford, CT (US); Sai Banala, Hamden, CT (US)

(73) Assignee: University of Delaware, Newark, DE (US)

( * ) Notice: Subject to any disclaimer, the term of this patent is extended or adjusted under 35 U.S.C. 154(b) by 1883 days.

(21) Appl. No.: 12/062,885

(22) Filed: Apr. 4, 2008

(65) Prior Publication Data
US 2008/0249438 A1    Oct. 9, 2008

Related U.S. Application Data (60) Provisional application No. 60/922,215, filed on Apr. 6, 2007.

(51) Int. Cl.
*A61H 1/00* (2006.01)
*A61H 1/02* (2006.01)
*A61H 5/00* (2006.01)
*B25J 9/00* (2006.01)
*A61H 3/00* (2006.01)

(52) U.S. Cl.
CPC .............. *A61H 1/0237* (2013.01); *A61H 3/008* (2013.01); *A61H 2201/1623* (2013.01); *A61H 2201/163* (2013.01); *B25J 9/0006* (2013.01); *A61H 3/00* (2013.01); *A61H 2201/1676* (2013.01); *A61H 2201/1207* (2013.01); *A61H 1/0262* (2013.01); *A61H 2001/0211* (2013.01); *A61H 2201/1642* (2013.01); *A61H 2201/1635* (2013.01); *A61H 2201/165* (2013.01)
USPC ....................... 601/5; 601/35; 601/34; 601/33

(58) Field of Classification Search
CPC ......... A61H 1/02; A61H 1/00; A61H 1/0237; A61H 1/024; A61H 1/0244; A61H 1/0255; A61H 1/0262; A61H 1/0259; A61H 1/0266; A61H 1/0274; A61H 1/0214; A61H 1/0218; A61H 3/00; A61H 3/008
USPC .......................... 601/35, 34, 23, 5, 27, 33, 44
See application file for complete search history.

(56) References Cited

U.S. PATENT DOCUMENTS 5,013,037 A * 5/1991 Stermer ......................... 482/122
5,020,790 A   6/1991 Beard et al.
(Continued)

FOREIGN PATENT DOCUMENTS

| GB | 1 406 420 A | 9/1975 |
| WO | WO 94/09727 A | 5/1994 |
| WO | WO 00/28927 A | 5/2000 |

OTHER PUBLICATIONS

U.S. Appl. No. 11/113,729 of Agrawal et al., filed Apr. 25, 2005.
(Continued)

*Primary Examiner* — Justine Yu
*Assistant Examiner* — Colin W Stuart
(74) *Attorney, Agent, or Firm* — RatnerPrestia (57) ABSTRACT

Gait training apparatus and method for use thereof for providing leg swing assistance to a patient. The apparatus comprises a support structure and one or more leg orthoses attached to the support structure, each leg orthosis comprising a thigh member attached to the support structure at a hip joint, and a shank member attached to the thigh member at a knee joint. Both members have respective connectors for securing them to the corresponding body parts of the patient. The hip joint and knee joint are each biased by biasing members. The support structure may comprise a frame defining a patient activity region, including a base, a back support, a pair of support handles, and a weight support member mounted above the activity region. A method of using the device comprises selecting parameters for the biasing members using information about the patient.

15 Claims, 7 Drawing Sheets

(56) References Cited

U.S. PATENT DOCUMENTS

| | | | |
|---|---|---|---|
| 5,476,441 | A | 12/1995 | Durfee et al. |
| 6,039,707 | A | 3/2000 | Crawford et al. |
| 6,213,554 | B1 | 4/2001 | Marcoux et al. |
| 6,471,664 | B1 * | 10/2002 | Campbell et al. ............... 602/16 |
| 6,666,796 | B1 | 12/2003 | MacReady |
| 6,821,233 | B1 | 11/2004 | Colombo et al. |
| 7,247,128 | B2 | 7/2007 | Oga |
| 8,057,410 | B2 * | 11/2011 | Angold et al. .................... 601/5 |
| 2003/0023195 | A1 | 1/2003 | Rahman et al. |
| 2003/0062241 | A1 * | 4/2003 | Irby et al. .................... 192/81 C |
| 2004/0049291 | A1 | 3/2004 | Deharde et al. |
| 2005/0043661 | A1 | 2/2005 | Nashner |
| 2005/0059908 | A1 * | 3/2005 | Bogert .............................. 601/5 |
| 2006/0241539 | A1 | 10/2006 | Agrawal et al. |
| 2006/0293617 | A1 | 12/2006 | Einav et al. |
| 2007/0004570 | A1 * | 1/2007 | Afanasenko et al. ......... 482/124 |
| 2007/0270976 | A1 * | 11/2007 | DeHarde et al. ................ 623/27 |

OTHER PUBLICATIONS

U.S. Appl. No. 11/409,163 of Agrawal et al., filed Apr. 21, 2006.
Sunil K. Agrawal, Abbas Fattah, Sai Banala; "Design and Prototype of a Gravity-Balanced Leg Orthosis"; International Journal of HWRS; vol. 4, No. 3; Sep. 2003; pp. 13-16.
Sai K. Banala, Sunil K. Agrawal, Abbas Fattah, Katherine Rudolph, John P. Scholz; "A Gravity Balancing Leg Orthosis for Robotic Rehabilitation"; Proceedings of the 2004 IEEE International Conference on Robotics & Automation; Apr. 2004; pp. 2474-2479.
Abbas Fattah, Ph.D. et al.; "Design of a Gravity-Balanced Assistive Device for Sit-to-Stand Tasks" ASME Journal; Proceedings of DETC '04 ASME 2004 Design Engineering Technical Conferences Sep. 28-Oct. 2, 2004; Salt Lake City, Utah, USA; pp. 1-7.
Roman Kamnik, et al.; "Robot Assistive Device for Augmenting Standing-Up Capabilities in Impaired People"; journal; Oct. 2003; pp. 3606-3611; Proceedings of the 2003 IEEE/RSJ International Conference on Intelligent Robots and Systems, Las Vegas, NV; USA.
Michael Peshkin, et al.; "KineAssist: A Robotic Overground Gait and Balance Training Device"; Proceedings of the 2005 IEEE 9$^{th}$ International Conference on Rehabilitation Roboticss; 2005; pp. 241-246; Chicago PT LLC, Evanston, IL; USA.
Roman Kamnik et al.; "Rehabilitation Robot Cell for Multimodal Standing-Up Motion Augmentation"; article; Apr. 2005; pp. 2289-2294; Proceedings of the 2005 IEEE International Conference on Robotics and Automation; Barcelona, Spain; Spain.
T. Bajd et al.; "Standing-Up of a Healthy Subject and a Paraplegic Patient"; article; 1982; pp. 1-10; vol. 15, No. 1; J. Biomechanics, Great Britain.
N de N Donaldson et al.; "FES Standing: Control by Handle Reactions of Leg Muscle Stimulation" (CHRELMS); Dec. 1996; pp. 280-284; vol. 4, No. 4; IEEE Transactions on Rehabilitation Engineering; New York, NY; USA.
Abbas Fattah, Sunril K. Agrawal; "On the Design of a Passive Orthosis to Gravity Balance Human Legs"; Professor; vol. 127, Jul. 2005; Journal of Mechanical Design; pp. 802-808.
Sunril K. Agrawal; Sai K. Banala; Gait Rehabilitation With an Active Leg Orthosis;,Proceedings of IDETC/CIE 2005; pp. 1-7.
Sunil K. Agrawal and Abbas Fattah; "Theory and Design of an Orthotic Device for Full or Partial Gravity-Balancing of a Human Leg During Motion"; IEEE Transactions on Neural Systems and Rehabilitation Engineering, vol. 12, No. 2, Jun. 2004; pp. 157-165.
Sai K. Banala, Alexander Kulpe and Sunil K. Agrawal; "A Powered Leg Orthosis for Gait Rehabilitation of Motor-Impaired Patients"; 2007 IEEE International Conference on Robotics and Automation, Roma Italy, Apr. 10-14, 2007; pp. 4140-4145.
Robert Riener, Maurizio Ferrarin, Esteban Enrique Pavan, Carlo Albino Frigo; "Patient-Driven Control of FES-Supported Standing Up and Sitting Down: Experimental Results"; IEEE Transactions of Rehabilitation Engineering, vol. 8, No. 4, Dec. 2000; pp. 523-529.
Robert Reiner, Lars Lunenburger, Saso Jezernik, Martin Anderschitz, Gery Colombo, and Volker Dietz; "Patient-Cooperative Strategies for Robot-Aided Treadmill Training": First Experimental Results; IEEE Transactions on Neural Systems and Rehabilitative Engineering; vol. 13, No. 3, Sep. 2005; pp. 380-394.
R.Ekkelenkamp, J. Veneman and H Van Der Kooij; "LOPES: a lower extremity powered exoskeleton"; 2007 IEEE International Conference on Robotics and Automation Roma, Italy, Apr. 10-14, 2007; pp. 3132-3133.
Robert Reiner & Thomas Edrich; "Identification of passive elastic joint moments in the lower extremities"; Journal of BioMechanics; 1999; pp. 539-544.
Michael Bernhardt, Martin Frey, Gery Colombo, Robert Reiner; "Hybrid Force-Position Control Yields Cooperative Behaviour of the Rehabilitation Robot LOKOMAT"; Proceedings of the 2005 IEEE 9$^{th}$ International Conference of Rehabilitation Robotics; Jun. 28-Jul. 1, 2005, Chicago, IL, USA; pp. 536-539.
Saso Jezernik, Gery Colombo, Manfred Morari; "Automatic Gait-Pattern Adaptation Algorithms for Rehabilitation With a 4-DOF Robotics Orthosis"; IEEE Transactions in Robotics and Automation; vol. 20, No. 3, Jun. 2004; pp. 574-582.
D. Aoyagi, W.E. Ichinose, J.E. Bobrow, S,J. Harkema; "An Assistive Robotic Device That Can Synchronize to the Pelvic Motion During Human Gait Training"; Proceedings of the 2005 IEEE 9$^{th}$ International Conference of Rehabilitation Robotics; Jun. 28-Jul. 1, 2005, Chicago, IL, USA; pp. 565-568.
Lance L. Cai, Andy J. Fong, Yongqiang Liang Joel Burdick, V. Reggie Edgerton; "Assist-as-needed Training Paradigms for Robotic Rehabilitation of Spinal Cord Injuries"; Proceedings of the 2006 IEEE International Conference of Robotics and Automation; Orlando, Florida—May 2006; pp. 3504-3511.
Robert Reiner, Martin Frey, Michael Bernhardt, Tobias Nef Gery Colombo; "Human-Centered Rehabilitation Robotics"; Proceedings of the 2005 IEEE 9$^{th}$ International Conference of Rehabilitation Robotics; Jun. 28-Jul. 1, 2005, Chicago, IL, USA; pp. 319-322.
Stephen Pledgie, Kenneth E. Barner, Member IEEE, Sunil K. Agrawal, Tariq Rahman; "Tremor Suppression Through Impedance Control"; IEEE Transaction on Rehabilitation Engineering; vol. 8, No. 1, Mar. 2000; pp. 53-59.
Sunil K. Agrawal, Abbas Fattah; "Design of an Orthotic Device for Full or Partial Gravity-Balancing of a Human Upper Arm During Motion"; Proceedings of the 2003 IEEE/RSJ Internation Conference on Intelligent Robots and Systems, Las Vegas, Nevada—Oct. 2003; pp. 2841-2846.
Abhishek Agrawal, Sunil K. Agrawal; "Design of Gravity balancing leg orthosis using non-zero free length springs"; Mechanism and Machine Theory; Science Direct; pp. 693-709.
Abbas Fattah, Sunil K. Agrawal, Glenn Catlin, John Hamnett; "Design of a Passive Gravity-Balanced Assistive Device for Sit-to-Stand Tasks"; vol. 128, ASME; Sep. 2006; pp. 1122-1129.
International Search Report for International Application No. PCT/US08/04330 mailed Jul. 25, 2008.
International Search Report for International Application No. PCT/US08/04319 mailed Jul. 25, 2008.
U.S. Appl. No. 12/062,903 of Banala et al., filed Apr. 4, 2008.
International Preliminary Report on Patentability dated Oct. 6, 2009.

* cited by examiner

PASSIVE SWING ASSIST LEG EXOSKELETON

CROSS-REFERENCE TO RELATED APPLICATIONS

This application claims priority to U.S. Provisional Application Ser. No. 60/922,215, filed Apr. 6, 2007, incorporated herein by reference.

STATEMENT REGARDING FEDERALLY SPONSORED RESEARCH

The U.S. Government has a paid-up license in this invention and the right in limited circumstances to require the patent owner to license others on reasonable terms as provided for by the terms of NIH Grant #1 RO1 HD38582-01A2, awarded by the National Institutes of Health, and by a grant through the Rehabilitation Institute of Chicago (RIC) #06000936, awarded by the National Institute on Disability and Rehabilitation Research (NIDRR).

FIELD OF THE INVENTION

The present invention relates to leg orthoses, more specifically to passive orthoses for gait training.

BACKGROUND OF THE INVENTION

The incidence of spinal cord injury (SCI) in the United States is approximately 11,000 per year, with a prevalence of about 250,000 incidents. Damage to the spinal cord interrupts motor commands to the muscles and internal organs, resulting in loss of ambulation and damage to autonomic functions. Approximately 52% of this population have motor incomplete lesions and therefore have the potential to regain functional ambulation. One of the primary goals of individuals with SCI is to regain the ability to walk. Restoration of independent ambulation is a major focus of rehabilitation in incomplete SCI (iSCI).

Currently, therapist-assisted, body-weight-supported treadmill training (BWSTT) is used for rehabilitation of many SCI patients. This is accomplished by making the patient walk on a motorized treadmill with a counter-weight harness system, while therapists aid the patient by manually moving the legs and trunk. Clinical trials of locomotor training in iSCI patients indicate improvements in walking. The use of BWSTT simply increases the safety and convenience of gait training. Despite these benefits, clinical practice of BWSTT is limited because of the requirement of at least three therapists to provide manual facilitation of appropriate stepping kinematics. Also, the duration of such training may be limited by therapist fatigue.

Various motorized (robotic) devices have been developed for rehabilitation of lower limbs. Using robotic assisted BWSTT in conjunction with body weight support (BWS), researchers have showed that significant improvements can be achieved in the walking ability of patients with chronic and sub-acute SCI. The cost of such a device makes it prohibitive for many facilities, however, which limits accessibility of step training for iSCI-inflicted individuals having geographic and/or socioeconomic barriers. Also, improvement is limited in many robotic locomotor devices because they provide assistance by moving the limbs through pre-determined kinematic patterns independent of voluntary effort.

To increase the accessibility of BWSTT, financial and physical costs should be minimized and voluntary activity should be maximized. Non-motorized devices have been developed to assist extremity movements by eliminating or reducing the effects of gravity, such as the gravity-balanced orthosis described in U.S. patent application Ser. No. 11/113,729 (hereinafter "the '729 application"), filed Apr. 25, 2005, and assigned to the assignee of the present invention, incorporated herein by reference. There is still a need in the art, however, for apparatus that offer improved assistance to the limbs or trunk of a user during BWSTT to maximize voluntary motor activity during gait training required for recovery of independent ambulation.

SUMMARY OF THE INVENTION

One aspect of the invention comprises gait training apparatus for providing leg swing assistance to a patient. The apparatus comprises one or more leg orthoses that are attached to the support structure. Each leg orthosis comprises a thigh member attached to the support structure at a device hip joint, and a shank member attached to the thigh member at a device knee joint. The thigh member has a thigh connector for securing the thigh member to a corresponding thigh of a patient, and the shank member has a shank connector for securing the shank member to a corresponding shank of a patient. The device hip joint is biased by a first torsion spring, and knee joint is biased by a second torsion spring. The apparatus may further comprise a support frame defining a patient activity region. The frame comprises a base, a back support defining a rear of the activity region, a pair of support handles extending from the support frame to define opposite sides of the activity region, and a weight support member mounted above the activity region.

Another aspect of the invention comprises a method for gait training a patient, the method comprising the steps of: (a) providing gait training apparatus as set forth above; (b) determining desired parameters for the first and second torsion springs for each orthosis, and selecting springs with the desired parameters; (c) securing the orthosis to a patient located within the activity region; and (d) causing the patient to ambulate such that the orthosis provides passive swing assistance to the user's gait.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawing are the following figures.

DETAILED DESCRIPTION OF THE INVENTION

Referring now to the figures, we describe an exemplary passive device for swing assistance of patients, such as motor incomplete spinal cord injury patients, during treadmill training. This device is aimed at reducing the physical demands associated with therapist assisted bodyweight supported treadmill training (BWSTT), the current method used for rehabiliation of such patients. Passive elements in the system that get charged during the stance phase of the user's gait assist the patient during the swing phase of the gait.

This passive device for swing assistance is ideal for patients with iSCI during BWSTT, but is not limited to any particular application. Mathematical models that predict the natural motion of the leg once it gets strapped to the orthosis were used to scientifically design the swing assist bilateral orthosis. These models of the swinging leg provide insights into the motion, bring a framework for optimization of the parameters of the orthosis, and allow study of robustness of the design to parameter variations across subjects.

Based on the motion of hip, two different models of motion of human leg on a treadmill were considered. In Model 10, shown in FIG. 1, the hip is inertially fixed during the swing phase. In Model 20, shown in FIG. 2, the hip follows the motion of an inverted pendulum over the stance leg. In these models, the human leg has two moving segments, thigh 12 and the shank 14. The foot was modeled as a point mass.

Human gait consists of two phases, the swing phase and stance phase. While one leg is in the swing phase, the other leg is in stance on the treadmill. The exemplary swing assistive device 10, shown in FIG. 1, comprises a hip joint spring 32 and a knee joint spring 34, each of which are preferably torsion springs, whose torsion constants and equilibrium configurations define the design parameters.

Model 1: Inertially Fixed Hip

Figure 1:
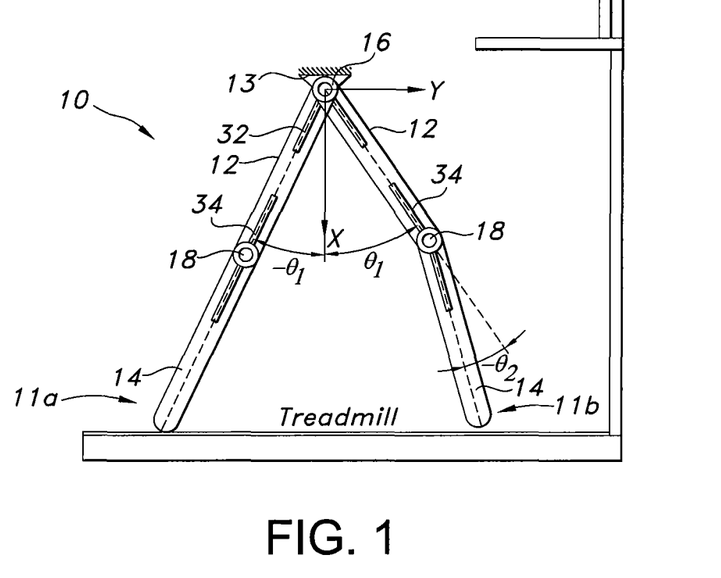
FIG. 1 is a schematic drawing of a human leg in the saggital plane with an inertially fixed hip in accordance with Model 1 discussed herein.

Referring now to FIG. 1, Model 1 assumes a system comprising a pair of human legs 11a (in the stance leg position) and 11b (in the swing leg position) with inertially fixed hip 13 having a thigh 12, a shank 14, a hip joint 16, and a knee joint 18. The hip and knee angles ($\theta_1$ and $\theta_2$, respectively) are defined in the counter clock wise direction per standard anthropometry and as shown in FIG. 1. Thus, the hip joint has an equilibrium angle $\theta_{1eq}$ measured from a vertical plane perpendicular to a saggital plane of the patient through the hip joint, in which a positive value represents a forward step. The knee joint has an equilibrium angle $\theta_{2eq}$ measured from a position in which the shank is positioned 180 degrees relative to the thigh member and in which a negative value represents a normal angular position for a human knee. The foot is not considered in this model. The exemplary swing assistance device 10 shown in FIG. 1 comprises two torsion springs: hip joint spring 32 and knee joint spring 34. The stiffness constants $c_1$, $c_2$ and the equilibrium configurations $\theta_{1eq}$, $\theta_{2eq}$ of these springs are design parameters. The system dynamics depends on the masses of the thigh and shank ($m_1$ and $m_2$, respectively), the lengths of thigh and shank segments ($L_1$ and $L_2$, respectively); the location of the center of mass of the thigh and shank measured from the respective joints ($L_{c1}$ and $L_{c2}$, respectively); and the inertia of thigh and shank about their center of mass ($I_1$ and $I_2$, respectively). Anthropomorphic data is used for the geometry and inertial quantities.

Model 1 Equations of Motion

Swing leg dynamics can be written using the Lagrange equations.

$$\frac{d}{dt}\frac{\partial \pounds}{\partial \dot{\theta}_i} - \frac{\partial \pounds}{\partial \theta_i} = 0, \quad (1)$$
$$i = 1,2$$

The Lagrange function is defined as $$\pounds = K.E. - P.E. \quad (2)$$

where $$K.E. = \frac{1}{2}m_1 \dot{r}_{1cm}^2 + \frac{1}{2}I_1 w_1^2 + \frac{1}{2}m_2 \dot{r}_{2cm}^2 + \frac{1}{2}I_2 w_2^2 \quad (3)$$

$$P.E. = \quad (4)$$
$$-m_1 g(r_{1cm} \cdot \hat{e}_x) + \frac{1}{2}c_1(\theta_1 - \theta_{1eq})^2 - m_2 g(r_{2cm} \cdot \hat{e}_x) + \frac{1}{2}c_2(\theta_2 - \theta_{2eq})^2$$

$$r_{1cm} = L_{c1}\cos(\theta_1)\hat{e}_x + L_{c_1}\sin(\theta_1)\hat{e}_y \quad (5)$$

$$r_{2cm} = [L_1\cos(\theta_1) + L_{c2}\cos(\theta_1 + \theta_2)]\hat{e}_x + [L_1\sin(\theta_1) + L_{c2}\sin(\theta_1 + \theta_2)]\hat{e}_y \quad (6)$$

In the above equations, $\hat{e}_x$ and $\hat{e}_y$ are unit vectors along X and Y axes, $r_{1cm}$ and $r_{2cm}$ are centers of mass for the thigh and shank respectively, and g=acceleration due to gravity.

Figure 3:
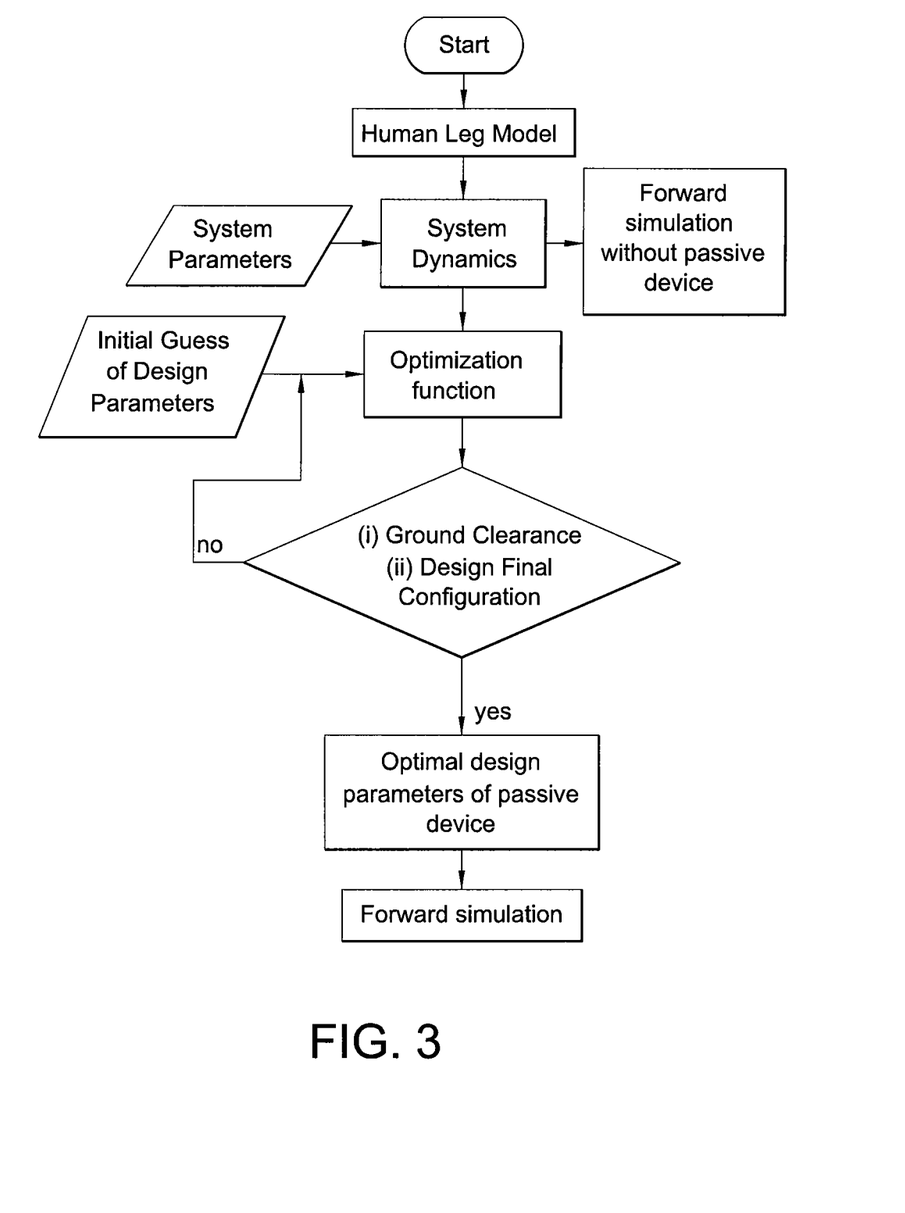
FIG. 3 is a flowchart depicting an exemplary method for optimization of parameters for use in the swing assistive orthosis of the present invention.

The optimization of the design is schematically described in FIG. 3. Given the desired initial and final configurations of the swing leg, the design parameters $c_1$, $c_2$, $\theta_{1eq}$, $\theta_{2eq}$ are found from an optimization routine that gives a feasible gait. During optimization, while solving system dynamics, an additional stiff spring that applies torque when the knee angle $\theta_2 > 0$ is used to prevent the knee angle from going above zero degrees in the model. In the optimization, the error from the swing final configuration is minimized, while a positive ground clearance at a discrete number of points is taken as a constraint. The optimized parameters are then used to perform forward simulations. During forward simulations, the additional stiff spring is not used. In this model, the hip is considered to be inertially fixed, so the swing leg dynamics are decoupled from the motion of stance leg.

Model 1 Simulation Results

The following average anthropometric data for a human leg of an individual with an average body weight of 72.6 kg, was used to obtain the simulation results.

$m_1$=0.1000×BodyWt
$m_2$=0.0465×BodyWt
$m_3$=0.0145×BodyWt=foot mass
$L_1$=0.41 m
$L_2$=0.40 m
$L_{c1}$=0.433×L1
$L_{c2}$=0.433×L2
$R_1$=0.323×$L_1$ (radius of gyration of thigh)
$R_2$=0.302×$L_2$ (radius of gyration of shank)

Foot mass and the device mass were not considered in Model 1 simulations. The initial configuration of the swing leg was taken as $[\theta_{1O}, \dot{\theta}_{1O}, \theta_{2O}, \dot{\theta}_{2O}] = [-pi/6.022, 0, 0, 0]$ and the final configuration was taken as $[\theta_{1f}, \dot{\theta}_{1f}, \theta_{2f}, \dot{\theta}_{2f}] = [-pi/6.022, 0, 0, 0]$ Desired gait time was chosen as 0.7 s. With these system parameters and desired configurations, the optimization routine gave design parameters as $c_1=0.427$ Nm/rad, $c_2=11.337$ Nm/rad, $\theta_{1eq.}=180°$, and $\theta_{2eq.}=-98.1°$. Simulation data when no swing assistance device was used showed that ground clearance was not achieved. When swing assistance device was used with optimized spring parameters, that the leg reached the goal point in a desirable manner. To check the robustness of the design as the leg mass is changed, additional simulations were run with the optimized design parameters kept constant but the leg mass changed by 10% and 20%, respectively, showing that the design was robust to 10-20% change in leg mass. The gait in these simulations took between 0.6 and 0.7 seconds to complete.

Model 2: Pendular Hip Motion

Figure 2:
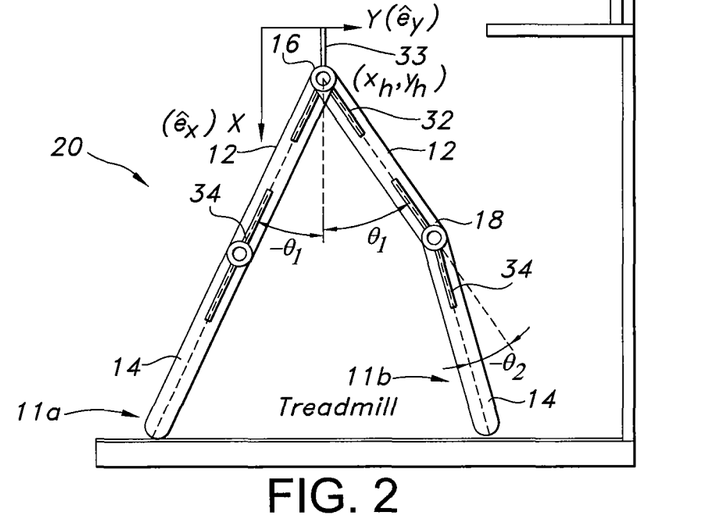
FIG. 2 is a schematic drawing of a human leg in the saggital plane with the hip point moving as an inverted pendulum in accordance with Model 2 discussed herein.

Referring now to FIG. 2, Model 2 assumes the same components as Model 1 except that the hip is not inertially fixed, but rather its position along a pendular arc depends on the motion of stance leg 11a. Using a kinematic model for the stance leg, the motion of hip was found, which was then used to find the dynamics of swing leg. In this kinematic model, it was assumed that the bottom (foot) of stance leg remains in continuous contact with the treadmill and slides along with the treadmill until the swing leg makes contact with the treadmill. It was also assumed that the knee remains locked during the stance phase and the hip can only have vertical motion, i.e., it is inertially fixed in the horizontal direction. If the treadmill moves at a constant speed v then the position of the contact point of the stance leg with the treadmill, $y_{ft}$ at time t is given as $$y_{ft}=y_{ft0}+vt$$

where $y_{ft0}$ is the position of the contact point at the start of stance phase.

Letting $x_t$ be the position of treadmill in the $\hat{e}_x$ direction, using kinematics, the vertical position of hip can be written as:

$$x_h(t)=x_t-\sqrt{(L_1+L_2)^2-(vt+y_{ft0}-y_h)^2} \quad (8)$$

$$y_h(t)=0 \text{ (hip inertially fixed in horizontal direction)} \quad (9)$$

Hip angle during stance phase $\theta_{ls}$ is given as $$\theta_{ls} = \tan^{-1}\left(\frac{y_{ft}-y_h}{x_t-x_h}\right) \quad (10)$$

Model 2 Equations of Motion

Swing leg dynamics with prescribed hip motion can be again written using Lagrange equations. The equations for K.E. and P.E. are the same as (3) and (4) above, with the analogous equations for (5) and (6) becoming:

$$r_{1cm} = [x_h + L_{c1}\cos(\theta_1)]\hat{e}_x + [y_h + L_{c_1}\sin(\theta_1)]\hat{e}_y \quad (11)$$

$$r_{2cm} = [x_h + L_1\cos(\theta_1) + L_{c2}\cos(\theta_1+\theta_2)]\hat{e}_x + [y_h + L_1\sin(\theta_1) + L_{c2}\sin(\theta_1+\theta_2)]\hat{e}_y \quad (12)$$

In the swing leg dynamic equations, quantities $\dot{x}_h, \ddot{x}_h, \dot{y}_h, \ddot{y}_h$ can be obtained by differentiating Eqns. (8) and (9). As in Model 1, given initial and desired final configurations of the swing leg, a similar optimization can be performed to find design parameters.

Knee Locking and Unlocking

In humans, the knee joint gets locked if the shank tries to move past (h=0). This knee locking event is an instance of impact. Once optimized design parameters are obtained, knee locking and unlocking events can be accounted for during forward simulation of dynamics. The impact equations corresponding to a knee locking event are obtained from the conservation of angular momentum about the hip joint.

$$H_{O,leg}^- = m_1[\dot{y}_h\cos(\theta_1)-\dot{x}_h]L_{C1} + m_1 L_{C1}^2 \dot{\theta}_1^- + I_1\dot{\theta}_1^- + \\ m_2[\dot{y}_h(L_1+L_{C2})\cos(\theta_1)-\dot{x}_h(L_1+L_{C2})\sin(\theta_1)] + \\ m_2(L_1+L_{C2})[(L_1+L_{C2}\dot{\theta}_1^-) + L_{C2}\dot{\theta}_2^-] + I_2(\dot{\theta}_1^- - \dot{\theta}_2^-) \quad (13)$$

$$H_{O,leg}^+ = mL_c[\dot{y}_h\cos(\theta_1)-\dot{x}_h\sin(\theta_1)] + mL_C^2\dot{\theta}_1^+ + I\dot{\theta}_1^+ \quad (14)$$

In the above equations, the "+" superscript indicates quantities after impact and the "−" superscript indicates quantities before impact. $H_{O,leg}$ denotes the angular momentum of the leg about hip joint, I denotes the moment of inertia of the whole leg about the center of mass of the whole leg, and $m=m_1+m_2$. Equating the angular momentum before and after impact, $\dot{\theta}_1^+$ can be obtained from the knowledge of $\theta_1, \theta_2, \dot{\theta}_1^-$ and $\dot{\theta}_2^-$;

Knee unlocking occurs when the reaction torque due to torsion spring, gravity force and shank acceleration is not positive. This condition is expressed in equation as follows $$-m_2 g L_{C2}\sin(\theta_1) + c_2\theta_{2eq} \\ -m_2 L_{C2}(-\ddot{x}_h\sin(\theta_1) + \ddot{y}_h\cos(\theta_1) + (L_1+L_{C2}\ddot{\theta}_1)) \leq 0 \quad (15)$$

In general, knee unlocking does not take place until the swing leg touches the ground. The same is observed in simulations.

Model 2 Simulation Results

In Model 2 simulations, the initial configuration and desired final configuration of the swing leg were taken to be the same as in Model 1 except that in this simulation an initial angular velocity for the hip angle $\dot{\theta}_1(0)=\dot{\theta}_{1s}(t=t_f)$ is considered. $\dot{\theta}_{1s}$ can be obtained from Eq. (10). For the stance leg, symmetrically opposite initial conditions were assumed (i.e., the final configuration of swing leg is taken as the initial configuration of the stance leg and the initial configuration of the swing leg is taken as the final configuration of the stance leg). Speed of the treadmill was then calculated by specifying the desired time to take one step, which for the purpose of this simulation was considered to be 0.8 s.

Apart from the thigh and shank mass, in this simulation, foot mass and device mass were also considered. The device mass for the thigh and shank segments were assumed to be 1 kg each and distributed such that their center of mass and radius of gyration coincide with the center of mass and radius of gyration of the thigh and shank segments respectively. One set of design parameters obtained from optimization routine are $c_1=7.90$ Nm/rad, $c_2=5.35$ Nm/rad, $\theta_{1eq}=22.2°$, $\theta_{2eq}=0°$.

Using these optimized design parameters one step and multistep simulations were performed. A simulation with optimized design parameters showed good ground clearance and a motion close to the desired final configuration. Even in simulations with the leg mass changed by 50%, the swing leg reached the goal point in a desirable manner. The gait in these simulations took between 0.8 and 0.85 seconds to complete. These results showed that the system is robust to variations in leg mass.

For a multistep simulation, the configuration of leg from a previous step was used as the initial configuration for the next step. Joint trajectories and $\theta_2$ vs $\theta_1$ for a 100 step simulation in which the leg mass was changed by 50% were almost same, indicating that the trajectory and angular relationships are stable and robust to changes in leg mass. Results showed that when $\theta_2$ tried to go past 0 degrees, the joint velocity was zero due to a knee locking event. The joint velocity continued to be zero until the leg touched the treadmill suggesting that a knee unlocking event does not occur.

Comparison of Model 1 to Model 2

In a human, the hip moves up and down during walking. Hence, Model 2 is closer to reality than Model 1. Also, it is easier to obtain ground clearance in Model 2 because the hip joint moves up and down. Accordingly, the range of knee angle motion is less in Model 2 as compared to the Model 1 and the motion in Model 2 is more graceful as compared to Model 1. Also, from a joint torque point of view, it is better to have a spring with less stiffness for the knee joint with an equilibrium configuration close to zero degrees. Model 2 is also more robust to changes in leg mass than Model 1, partly due to consideration of device mass in Model 2. Nonetheless, both Model 1 and Model 2 provide exemplary spring constants that may be used in the device of the present invention, and the invention is not limited to use of either of these models or any model, in particular.

Looking at the device from the energy flow point of view, the springs get charged during the stance phase with the help of treadmill and the body-weight support system. In swing phase, the potential energy stored in springs is converted to kinetic energy of the swing leg. Also, during this swing motion, some work is done at the hip, which is the boundary of the swing leg and the stance leg. Thus, energy flows in and out of the swing leg due to force interaction at the hip. Some amount of energy is lost in knee impact (a knee locking event) and some energy is lost in heel-strike event (when the heel of the swing leg impacts the treadmill at the end of the swing phase) thus returning the energy level of the leg back to its previous state. In human walking, there is a non-zero, finite-time double support phase. In this phase, both swing leg and stance leg are in contact with the ground. This double support phase may be taken into account in simulations that include modeling of the foot.

Exemplary Passive Swing Assist Device

Figure 4A:
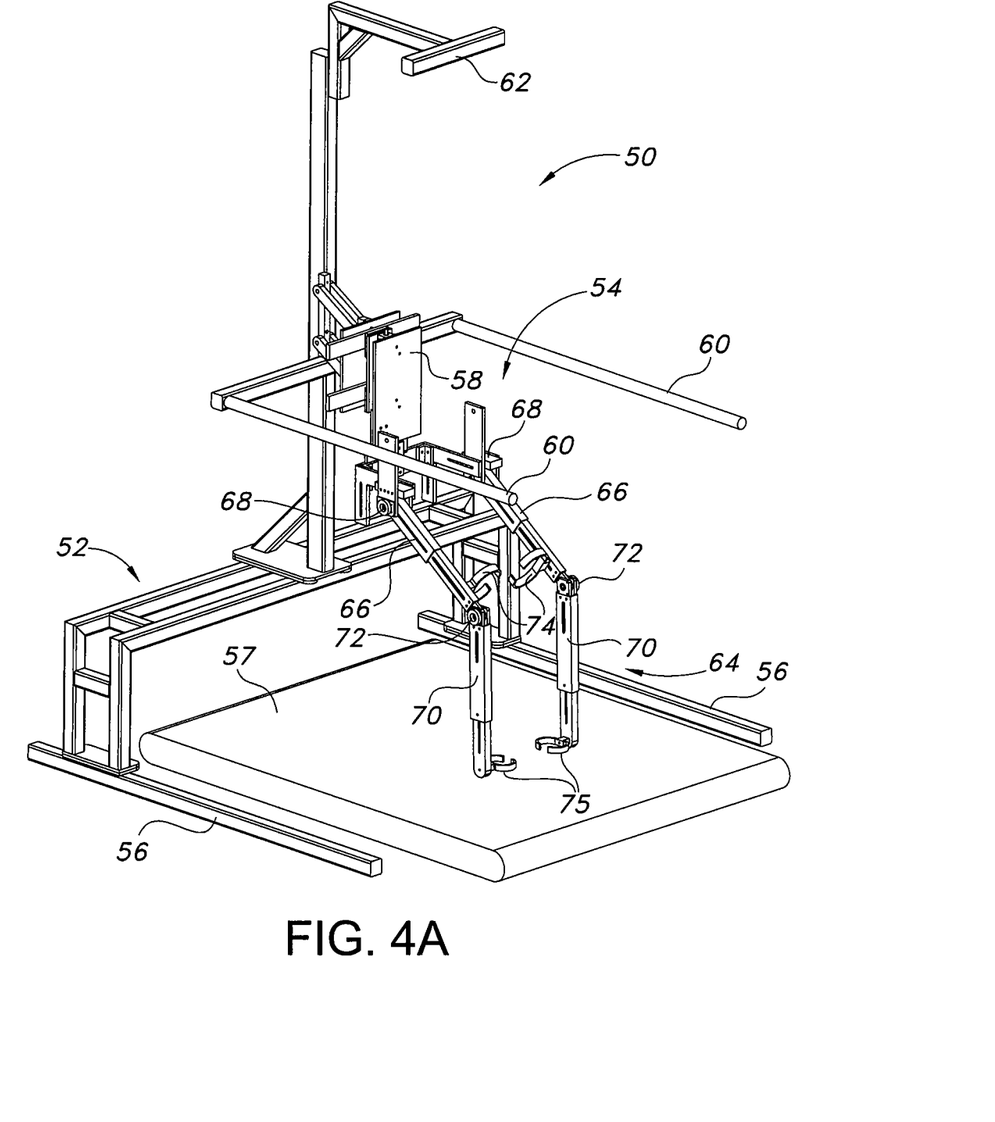
FIG. 4A is a perspective view of an exemplary swing assistance device in accordance with the present invention.
Figure 4B:
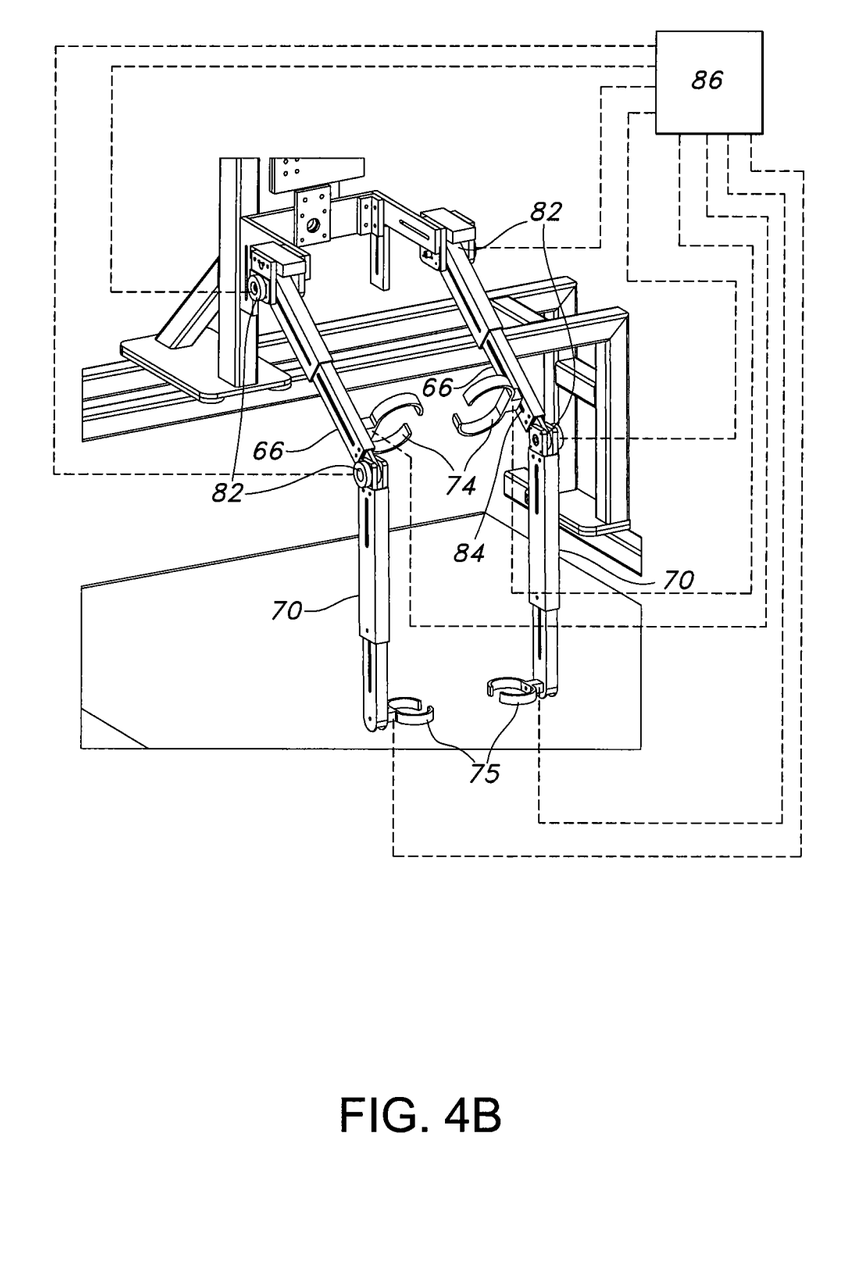
FIG. 4B is a detailed perspective view of the exemplary swing assistance device of FIG. 4A, showing exemplary locations of encoders and force sensors.

FIGS. 4A and 4B schematically illustrate an exemplary device to which the information from modeling may be applied. Device 50 comprises a support frame 52 defining a patient activity region 54 bounded by base 56 at the ground, back support 58 at the rear, and support handles 60 extending from the back support on opposite sides of the activity region. Weight support member 62 is mounted above the activity region. A pair of leg orthosis 64 are attached to the support structure, each leg orthosis comprising a thigh member 66 attached to the support structure at a hip joint 68 and a shank member 70 attached to thigh member 66 at a knee joint 72. Thigh connectors 74 secure each thigh member 66 to a corresponding thigh of a patient (not shown), and shank connectors 75 secure each shank member 70 to a corresponding shank of a patient. Each of the thigh and shank members 66, 70 may have an adjustable length for providing a fit to the measurements of the user. Preferably, back support system 58 is configured to allow the user's trunk to move up and down. A treadmill 57 is preferably provided underneath the orthosis.

As shown in FIG. 4B, each joint may comprise encoders 82 to gather information regarding the angular position of the joint and force torque sensors 84 may be provided at one or more user/orthosis interfaces 66, 70 for measuring net torque between the user by the device. The encoders 82 and force sensors 84 are preferably connected to a data storage/processing device 86 that stores data and/or allows processing of the data. In the configuration shown, one force-torque sensor may be sandwiched between the thigh link and the thigh brace and the other between the shank link and the foot piece. These sensors measure the forces and torques transmitted between the device and the human.

Figure 5A:
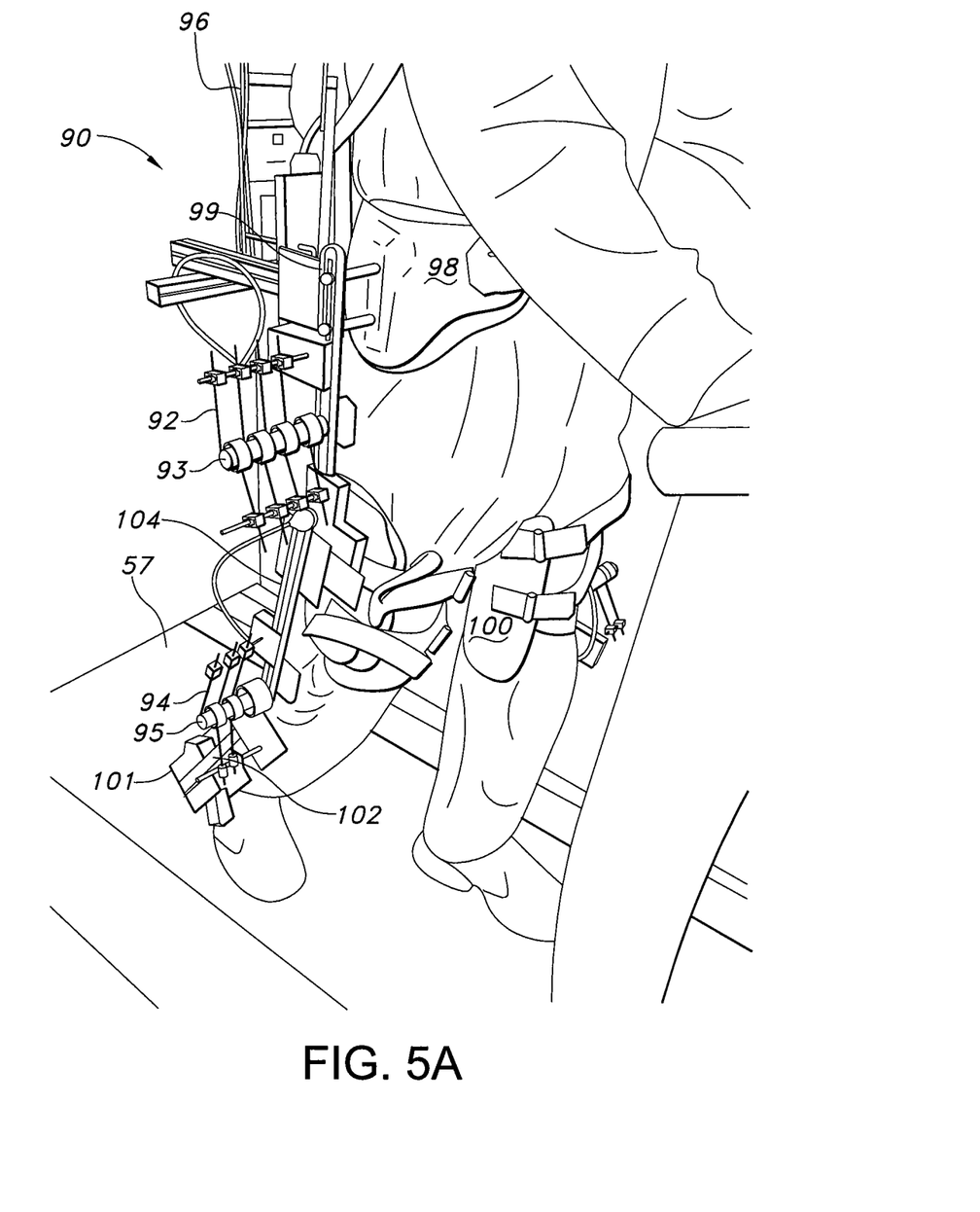
FIG. 5A is a perspective front view of a user in an exemplary leg orthosis of the present invention, showing an exemplary arrangement of torsion springs.
Figure 5B:
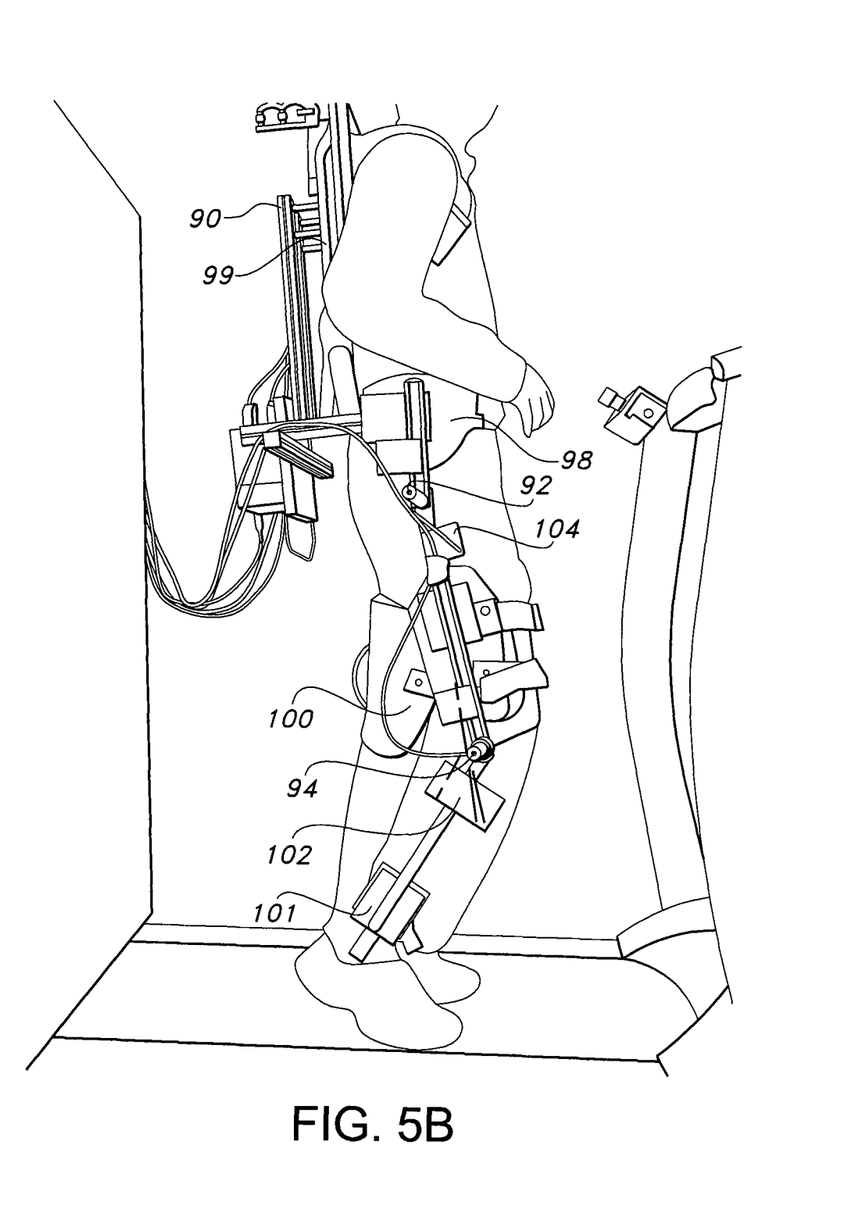
FIG. 5B is a side view of the user in the exemplary leg orthosis of the FIG. 5A.

FIGS. 5A and 5B show an exemplary orthosis 90 secured to a user. A first biasing member, namely set of torsion springs 92, biases hip joint 93 and a second biasing member, namely set of torsion springs 94, bias knee joint 95. Orthosis 90 is attached to a back pack frame 96 and includes a trunk belt 98 to which pelvis link 99 is rigidly attached for securing the trunk to the user, thigh brace 100 for securing the thigh link 104 to the user, and foot piece 101 for securing the bottom of the shank link 102 to the user. The foot piece 101 may be configured to allow ankle motion in the sagittal plane only, or may have additional degrees of freedom. The thigh and shank links 104, 102 are telescopic with means for affixing the link at a desired length to match them to the human wearing the device. Shank link 102 and thigh link 104 are attached to each other at knee joint 95 and thigh link 104 and pelvis link 99 are attached to each other at hip joint 93. Rigid attachment of pelvis link 99 to belt 98 and to back pack frame 96, keeps the orthosis aligned in the proper plane for administering the desired passive leg assistance. The back pack frame 96 in this case also holds the electronics associated with the sensors and encoders. In a rehabilitation environment, the weight of the electronics and sensors may be avoided when data collection is not desired. While a prototype device was constructed of machined aluminum, the invention is not limited to any specific materials of construction.

While the arrangement in FIGS. 5A and 5B is suitable for use with a patient who is able to support his or her weight and the weight of the orthosis, for patients with a greater degree of impairment or who are otherwise not able to support their own weight, a frame similar to that shown in FIGS. 4A and 4B that can bear the weight of the patient and back pack frame 96 is desired. The degree of weight support may be variable, such that a patient can be gradually worked into supporting his or her weight over time.

It should be noted that a set of springs is used rather than a single spring so that an overall spring constant as close as possible to those derived by modeling can be selected from stock springs of various sizes, rather than designing a single spring to fit each model result. It should also be noted that selection from stock parts may mean that the actual orthosis uses springs with resulting constants that are not exactly those derived by the model. Because the models tend to be rather robust, slight deviations from the derived values do not greatly alter the resulting performance. The knee joint may be mechanically prevented from assuming a positive equilibrium angle to avoid overextension of the user's knee joint.

Stiffness of the torsion springs and their equilibrium configurations may be derived from modeling, such as but not limited to the models discussed herein. The invention is not limited to any particular types of springs, spring parameters, models for developing the spring parameters, or even to springs as the biasing members. Although the models discussed above do not take into account the foot and may utilize other assumptions for the purposes of deriving the design constants, different or more precise models may be used that take the foot or other factors into account. Models may be used to develop standard one-size-fits all spring parameters for individuals falling within a certain range of sizes, or dynamic models may be developed that require input of specific information about the patient, such as body weight, gender, age, relative amount of muscle control and/or strength, thigh and shank sizes, limitations of joint motion, and the like. Thus, although the models described above do not take into account the amount of joint torque or range of motion for a specific patient, personalized solutions that include such considerations may be used.

One method of deriving spring constants and equilibrium personalized for a user is to use a powered orthosis, such as is described in co-pending Application Serial No. which claims priority to U.S. Provisional Application Ser. No. 60/922,216, titled "POWERED ORTHOSIS" filed by Sunil K. Agrawal et al., on the same day as the present application, assigned to the common assignee as the present application, and incorporated herein by reference. The powered leg orthosis, using the encoders on the motors for the linear actuators described therein, may be used to determine the amount of joint-torque required for a particular user in order to make the necessary motions for gait training. The information gathered via use of the powered orthosis may then be used to define the equivalent spring constants and equilibrium for the passive swing assist device of the present invention. Thus, a stroke victim in need of rehabilitation may be able to use the powered orthosis to develop the correct mechanics for the desired gait as well as to develop the proper spring parameters for the passive swing assist device. The less expensive passive swing assist device may then be used to provide passive swing assistance to the user's gait between scheduled therapy sessions on the more expensive robotic gait trainer.

Experimental Results

In experiments with the exoskeleton depicted in FIGS. 5A and 5B, the exoskeleton was first adjusted to match the limb lengths of the subject. The subject's anthropomorphic data was then used to find the optimal spring parameters while walking on the treadmill at a speed of 1.9 mph. The appropriate springs were mounted on the exoskeleton. The encoder and force-torque sensor data were collected using a dSpace 1103 system at 1000 Hz. The force-torque sensors were manufactured by ATI and the encoders by USDigital. The subject walked on the treadmill for 15 minutes with the exoskeleton to become acclimatized to it.

Figure 6:
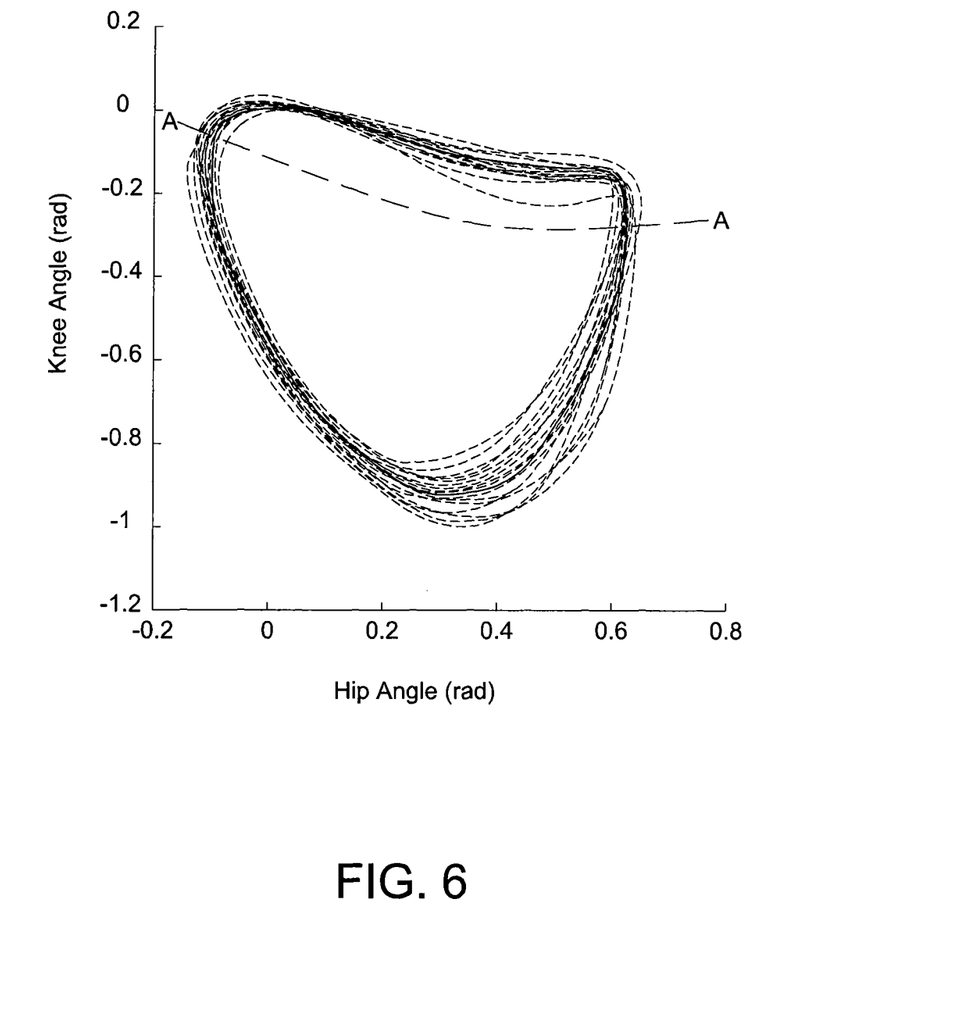
FIG. 6 is a plot of experimental results of knee angle vs. hip angle for a user wearing the exemplary orthosis of FIG. 5A walking on a treadmill at a speed of 2 mph.

Data was collected when a subject walked on a treadmill at different speeds, ranging from 1.0 mph to 4.0 mph. FIG. 6 shows the joint data for the knee angle ($\theta_2$) versus the hip angle ($\theta_1$) of a trial in which the treadmill speed was 2 mph. In this figure, multiple loops indicate multiple steps during the trial. The lower section of the lines below the dividing line A-A represent just the swing phase, extracted from the full step data represented by the completed loop. The black, solid line represents the average swing data, computed by averaging over the multiple cycles. Averaging was performed by normalizing the step data to a fixed time length. A 20-point moving average was used to smoothen the joint encoder data to compute the joint velocity and acceleration, using a central difference scheme.

The data was analyzed using two methods to bring out the performance differences with and without the exoskeleton. In a first method, the joint torques applied by the human during swing were estimated using the kinematic data obtained from the joint encoders and the force-torque data obtained from the interface force-torque sensors in conjunction with the leg dynamics discussed above. In a second method, the human applied joint torque was estimated using the dynamic model, where the inputs to this model were the kinematics recorded by the joint sensors. The second approach does not use the interface force-torque data in the computations and hence represents the torque needed to execute the same trajectory as in the first approach, but without the exoskeleton. In an ideal situation, if the exoskeleton was working completely according to the intended design, one would expect to see that the joint torques in the first approach are closer to zero, or much less compared to those predicted in the second approach.

Ideally, as mentioned earlier, one would expect to see the joint torques required by human to be smaller in the device, since the device parameters were found based on the assumption of zero-input from human. Experimental results agreed, indicating that a subject with less than normal muscle strength may be able to perform the desired gait while wearing the device. A similar comparison for knee joint torque showed that the absolute torque with the device was favorable during the early part of the swing but became comparable to the magnitude of the torque without it during the later part of the swing.

The experimental results indicated that the exoskeleton performed favorably over the swing at the designed treadmill speed, since it reduced the magnitude of the hip and knee joint torque. However, there was still room for improvement in performance of the exoskeleton. These results are remarkable considering the following observations: (i) the design is based on a simplistic model of sagittal plane human walking, (ii) the compliance of the human hip and knee joints were not accounted in the dynamic model, (iii) the fabricated device has inherent friction in the joints, which can be reduced but never completely eliminated, (iv) the torque-deflection curves of torsional springs are nonlinear, in general.

In order to evaluate the robustness of the design to variations in treadmill speed, joint motion and interface force-torque data were collected for a range of speeds between 1.0 mph-4.0 mph. In these comparisons, the time scale was normalized over different treadmill speeds to show the relative effects. For the hip joint, the device was most effective at a 2 mph treadmill speed. For the knee joint, the device was most effective at 4 mph treadmill speed. Stiffness of the torsion springs may be optimized to improve performance.

Device effectiveness at different treadmill speeds was compared showing robustness of the design over changes in the treadmill speed between 2 and 4 mph.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. Apparatus for providing leg swing assistance to a patient, the apparatus comprising:
a frame;
one or more leg orthoses attached to the frame and adapted to be secured to the patient, each leg orthosis comprising:
a thigh member attached to the frame at a hip joint, the hip joint comprising a first set of springs having a bias selected to exert a swing assistance force in a single direction upon a corresponding hip joint of a patient during gait training, the first set of springs comprising a plurality of springs having different respective spring constants; and
a shank member attached to the thigh member at a knee joint, the knee joint comprising a second set of springs having a bias selected to exert a swing assistance force in a single direction upon a corresponding knee joint of a patient during gait training, the second set of springs comprising a plurality of springs having different respective spring constants.

2. The apparatus of claim 1, wherein the first and second sets of springs comprises torsion springs.

3. The apparatus of claim 1, wherein the frame defines a patient activity region, the frame comprising a base, a back support defining a rear of the activity region, a pair of support handles extending from the frame to define opposite sides of the patient activity region, and a weight support member mounted above the patient activity region.

4. The apparatus of claim 3, further comprising a treadmill within the patient activity region for providing a moving surface on which the patient can walk.

5. The apparatus of claim 1, wherein the frame comprises a pelvis link and means for aligning the orthosis in a desired plane of movement.

6. The apparatus of claim 5, wherein the frame comprises a back pack frame.

7. The apparatus of claim 1, wherein the one or more leg orthoses is secured to the patient by a thigh brace and a trunk belt.

8. The apparatus of claim 1, wherein the thigh member and the shank member each have first components and second components movable with respect to the respective first components, such that the thigh member and the shank member are adjustable in length.

9. The method of claim 1, wherein each set of springs is configured to discharge potential energy during movement of the associated joint in the first direction and to accumulate potential energy during movement of the associated joint opposite the first direction.

10. The apparatus of claim 1, wherein the respective spring constants of the plurality of springs are determined by simulating a gait of the patient using at least one mathematical model that is predictive of natural motion of a leg of the patient.

11. A method for gait training a patient, the method comprising:
a) providing gait training apparatus comprising:
a frame and one or more leg orthoses attached to the frame, each leg orthosis comprising:
a thigh member attached to the frame at a hip joint, the hip joint adapted to receive bias from a first set of springs comprising a plurality of springs having a different respective spring constant; and
a shank member attached to the thigh member at a knee joint, the knee joint adapted to receive bias from a second set of springs comprising a plurality of springs having different respective spring constants;
b) determining desired parameters for the first and second sets of springs for each orthosis by simulating a gait of the patient using at least one mathematical model that is predictive of natural motion of a leg of the patient or by using a powered orthosis to measure joint torque required by the patient to make motions necessary for the gait training, and selecting the springs of the first and second set of springs with the desired parameters;
c) securing the one or more leg orthoses to a patient;
d) causing the patient to ambulate such that each biasing member of the one or more orthosis provides passive swing assistance to the patient's gait in a single direction.

12. The method of claim 11, wherein the apparatus comprises a treadmill underneath the patient, and step (d) comprises activating the treadmill.

13. The method of claim 11, wherein step (b) comprises determining the desired parameters for the springs of the first and second set of springs using information about the patient.

14. The method of claim 11, wherein the frame comprises a backpack frame attached to a pelvis link with a trunk support and the one or more leg orthosis further comprises a thigh support and a foot connection, in which step (c) comprises placing the backpack on the patient, and securing the trunk support, thigh support and foot connection to the patient.

15. The method of claim 11, wherein the frame defines a patient activity region and comprises a base, a back support defining a rear of the patient activity region, a pair of support handles extending from the frame defining opposite sides of the patient activity region, and a weight support member mounted above the patient activity region, in which step (c) comprises securing the patient to the orthosis such that the weight support bears the weight of the patient and the one or more leg orthoses.

* * * * *